United States Patent
Sanada et al.

(10) Patent No.: US 9,534,127 B2
(45) Date of Patent: Jan. 3, 2017

(54) AQUEOUS INK, INK CARTRIDGE AND INK JET RECORDING METHOD

(71) Applicant: CANON KABUSHIKI KAISHA, Tokyo (JP)

(72) Inventors: Mikio Sanada, Kawasaki (JP); Taiki Watanabe, Akishima (JP); Ryuji Higashi, Kawasaki (JP); Koichi Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/749,933

(22) Filed: Jun. 25, 2015

(65) Prior Publication Data
US 2015/0376428 A1      Dec. 31, 2015

(30) Foreign Application Priority Data
Jun. 30, 2014 (JP) .................................. 2014-133780

(51) Int. Cl.
C09D 11/324   (2014.01)
C09D 11/30    (2014.01)
C09D 11/322   (2014.01)

(52) U.S. Cl.
CPC ............. *C09D 11/324* (2013.01); *C09D 11/30* (2013.01); *C09D 11/322* (2013.01)

(58) Field of Classification Search
CPC ...... C09D 11/30; C09D 11/322; C09D 11/324
See application file for complete search history.

(56) References Cited

U.S. PATENT DOCUMENTS

| | | | |
|---|---|---|---|
| 5,451,251 A | 9/1995 | Mafune et al. |
| 5,571,313 A | 11/1996 | Mafune et al. |
| 5,630,868 A | 5/1997 | Belmont et al. |
| 5,911,815 A | 6/1999 | Yamamoto et al. |
| 6,027,210 A | 2/2000 | Kurabayashi et al. |
| 6,062,674 A | 5/2000 | Inui et al. |
| 6,174,354 B1 | 1/2001 | Takizawa et al. |
| 6,221,141 B1 | 4/2001 | Takada et al. |

(Continued)

FOREIGN PATENT DOCUMENTS

| | | |
|---|---|---|
| JP | H10-510862 A | 10/1998 |
| JP | 2003-535949 A | 12/2003 |

(Continued)

OTHER PUBLICATIONS

Taiki Wantanabe Koichi Suzuki Ryuji Higashi Masashi Hirose, U.S. Appl. No. 14/747,343, filed Jun. 23, 2015.

(Continued)

*Primary Examiner* — Veronica F Faison
(74) *Attorney, Agent, or Firm* — Fitzpatrick, Cella, Harper & Scinto

(57) ABSTRACT

The invention provides an aqueous ink containing a self-dispersible pigment having a carboxylic acid group bonded directly or through another atomic group to a particle surface of a pigment and a lactone group bonded to the particle surface of the pigment, wherein, as determined by a selective neutralization method, an introduced amount of the carboxylic acid group is 0.60 mmol/g or more and a ratio of an introduced amount (mmol/g) of the lactone group to the introduced amount (mmol/g) of the carboxylic acid group is 0.20 time or less.

14 Claims, 2 Drawing Sheets

(56) References Cited

U.S. PATENT DOCUMENTS

| | | |
|---|---|---|
| 6,280,513 B1 | 8/2001 | Osumi et al. |
| 6,332,919 B2 | 12/2001 | Osumi et al. |
| 6,375,317 B1 | 4/2002 | Osumi et al. |
| 6,425,662 B1 | 7/2002 | Teraoka et al. |
| 6,511,534 B1 | 1/2003 | Mishina et al. |
| 6,521,034 B1 | 2/2003 | Osumi et al. |
| 6,528,146 B2 | 3/2003 | Okuda et al. |
| 6,547,381 B2 | 4/2003 | Watanabe et al. |
| 6,585,366 B2 | 7/2003 | Nagata et al. |
| 6,706,105 B2 | 3/2004 | Takada et al. |
| 6,802,925 B2 | 10/2004 | Kobayashi et al. |
| 6,852,156 B2 | 2/2005 | Yeh et al. |
| 7,005,461 B2 | 2/2006 | Sanada et al. |
| 7,160,376 B2 | 1/2007 | Watanabe et al. |
| 7,276,110 B2 | 10/2007 | Tsujimura et al. |
| 7,276,112 B2 | 10/2007 | Tokuda et al. |
| 7,347,890 B2 | 3/2008 | Nito et al. |
| 7,371,274 B2 | 5/2008 | Sanada et al. |
| 7,402,200 B2 | 7/2008 | Imai et al. |
| 7,423,075 B2 | 9/2008 | Ikegami et al. |
| 7,442,753 B2 | 10/2008 | Tsubaki et al. |
| 7,449,513 B2 | 11/2008 | Sato et al. |
| 7,498,364 B2 | 3/2009 | Sato et al. |
| 7,528,179 B2 | 5/2009 | Suda et al. |
| 7,528,182 B2 | 5/2009 | Teshima et al. |
| 7,538,147 B2 | 5/2009 | Sato et al. |
| 7,563,853 B2 | 7/2009 | Tsubaki et al. |
| 7,598,332 B2 | 10/2009 | Ikegami et al. |
| 7,601,790 B2 | 10/2009 | Sato et al. |
| 7,605,192 B2 | 10/2009 | Sanada et al. |
| 7,635,182 B2 | 12/2009 | Hakamada et al. |
| 7,641,722 B2 | 1/2010 | Lee et al. |
| 7,682,433 B2 | 3/2010 | Yanagimachi et al. |
| 7,695,099 B2 | 4/2010 | Sanada et al. |
| 7,699,924 B2 | 4/2010 | Mafune et al. |
| 7,704,414 B2 | 4/2010 | Sato et al. |
| 7,753,515 B2 | 7/2010 | Tokuda et al. |
| 7,754,000 B2 | 7/2010 | Nakahama et al. |
| 7,846,247 B2 | 12/2010 | Mizutani et al. |
| 7,862,653 B2 | 1/2011 | Sanada et al. |
| 7,866,806 B2 | 1/2011 | Sato et al. |
| 7,914,616 B2 | 3/2011 | Nakahama et al. |
| 7,988,277 B2 | 8/2011 | Moribe et al. |
| 8,007,097 B2 | 8/2011 | Sanada et al. |
| 8,016,406 B2 | 9/2011 | Hakamada et al. |
| 8,016,932 B2 | 9/2011 | Okamura et al. |
| 8,177,902 B2 | 5/2012 | Nakahama et al. |
| 8,393,726 B2 | 3/2013 | Moribe et al. |
| 8,450,393 B2 | 5/2013 | Tsubaki et al. |
| 8,580,024 B2 | 11/2013 | Gu |
| 8,672,465 B2 | 3/2014 | Sanada et al. |
| 8,857,967 B2 | 10/2014 | Saito et al. |
| 8,899,736 B2 | 12/2014 | Sanada et al. |
| 2002/0014184 A1 | 2/2002 | Yeh et al. |
| 2003/0145761 A1* | 8/2003 | Redfearn .............. C09D 11/32 106/31.6 |
| 2005/0131102 A1 | 6/2005 | Nakazawa et al. |
| 2005/0197424 A1 | 9/2005 | Higashi et al. |
| 2005/0239918 A1 | 10/2005 | Nakazawa et al. |
| 2006/0050117 A1 | 3/2006 | Sato et al. |
| 2006/0098068 A1 | 5/2006 | Hakamada et al. |
| 2006/0100310 A1 | 5/2006 | Nakazawa et al. |
| 2006/0135647 A1 | 6/2006 | Ichinose et al. |
| 2006/0160975 A1 | 7/2006 | Suda et al. |
| 2006/0169171 A1 | 8/2006 | Lee et al. |
| 2006/0250463 A1 | 11/2006 | Nakazawa et al. |
| 2009/0182076 A1 | 7/2009 | Teshima et al. |
| 2010/0189902 A1* | 7/2010 | Koike ................ C09D 11/322 427/256 |
| 2010/0307377 A1 | 12/2010 | Gu |
| 2012/0268518 A1 | 10/2012 | Saito et al. |
| 2015/0029241 A1 | 1/2015 | Sanada et al. |

FOREIGN PATENT DOCUMENTS

| | | |
|---|---|---|
| JP | 2012-528917 A | 11/2012 |
| JP | 5085868 B2 | 11/2012 |

OTHER PUBLICATIONS

Taiki Wantanabe Koichi Suzuki Ryuji Higashi, U.S. Appl. No. 14/748,354, filed Jun. 24, 2015.
Ryuji Higashi Taiki Wantanabe Koichi Suzuki, U.S. Appl. No. 14/748,697, filed Jun. 24, 2015.
Ryuji Higashi Taiki Wantanabe Koichi Suzuki Hiroshi Tanabe, U.S. Appl. No. 14/748,717, filed Jun. 24, 2015.
Takakazu Mizutani Koichi Suzuki Ryuji Higashi Taiki Wantanabe, U.S. Appl. No. 14/749,820, filed Jun. 25, 2015.

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

An ink jet recording method can conduct recording on various recording media. Various kinds of inks such as, for example, an ink suitable for recording an image having photograph-like quality on glossy paper and an ink suitable for recording a document on plain paper for purpose of recording a better image have been proposed according to its purpose. In recent years, the ink jet recording method has also been utilized for printing a business document including characters and diagrams using a recording medium such as plain paper, and utilization frequency to such use has remarkably increased. In such use, it is required to more improve an optical density of an image recorded and reliability of an ink used.

It is advantageous from the viewpoint of improving the optical density of the image to use a self-dispersible pigment as a coloring material of the ink. When the self-dispersible pigment is used as the coloring material of the ink, it is favorable that the dispersion stability of the pigment in the ink is secured, and moreover the pigment is aggregated immediately after the ink is applied to a recording medium. In addition, after the ink has been applied to the recording medium, the pigment is favorably caused to exist on the surface of the recording medium as much as possible by permeating a liquid component such as water into the recording medium. Therefore, a self-dispersible pigment with an anionic group introduced in plenty into a particle surface of the pigment is favorably used. When such a self-dispersible pigment is used, the pigment can be stably dispersed in the ink by repulsive force between anionic groups. In addition, after the ink has been applied to the recording medium, the dispersed state can be unstabilized by vanishment of the repulsive force between anionic groups which is caused by evaporation of water, thereby immediately aggregate the pigment. From the viewpoint of achieving both good dispersion stability in the ink and improvement of an optical density of an image by acceleration of pigment aggregation in the recording medium, a carboxylic acid group is favorably selected as the anionic group introduced to the particle surface of the pigment.

Various type pigments are known as the self-dispersible pigment to which the carboxylic acid group has been introduced and roughly divided into an oxidation type and a surface modification type according to the production processes thereof. The oxidation type self-dispersible pigment is obtained by subjecting a pigment to an oxidation treatment with ozone gas or hypochlorous acid (see Japanese Patent Application Laid-Open No. 2003-535949). The surface modification type is obtained by chemically treating a pigment with a compound having an anionic group, such as a diazonium salt or a hydrazine compound (see Japanese Patent Application Laid-Open No. H10-510862 and Japanese Patent Application Laid-Open No. 2012-528917). There is further a self-dispersible pigment obtained by bonding a carboxylic acid group to a pigment by an oxidation treatment and then further bonding a functional group having a lactone group at a terminal thereof (see Japanese Patent No. 5085868).

When an image where a region recorded by an ink containing a self-dispersible pigment and a region recorded by another ink adjoin each other is recorded, bleeding is generally eased by the following recording control. That is, after repulsive force between anionic groups of the self-dispersible pigment has vanished, and the self-dispersible pigment has start to aggregate in a recording medium, another ink is applied, thereby preventing the self-dispersible pigment from flowing into the region recorded by another ink. However, when a region where an application amount of an ink is large, such as a multi-order color image, is recorded adjoiningly to the region recorded by the ink containing the self-dispersible pigment, a phenomenon (white blur phenomenon) in which an image looks whitish occurs different from the bleeding. This "white blur phenomenon" is a phenomenon caused by allowing the self-dispersible pigment present in the vicinity of a boundary portion between the above two regions to sink in the interior of the recording medium.

The oxidation type self-dispersible pigment described in Japanese Patent Application Laid-Open No. 2003-535949 is hard to control a chemical species introduced to the particle surface of the pigment. Therefore, a nonionic hydrophilic group such as a lactone group comes to be bonded in plenty to the particle surface of the pigment, not just the carboxylic acid group. When the lactone group is bonded in plenty to the particle surface of the pigment, the aggregation of the pigment becomes gentle due to the hydrophilicity of the lactone group even after the repulsive force between anionic groups has vanished. In addition, the self-dispersible pigment described in Japanese Patent No. 5085868 has not only a lactone group formed on the particle surface of the pigment by the oxidation treatment, but also the functional group having the lactone group at the terminal thereof, so that the aggregation of the pigment becomes gentle.

On the other hand, the surface modification type self-dispersible pigments described in Japanese Patent Application Laid-Open No. H10-510862 and Japanese Patent Application Laid-Open No. 2012-528917 are easy to control a chemical species introduced to the particle surface of the pigment compared with the oxidation type self-dispersible pigment. However, even in the self-dispersible pigments of the above-described types, a certain amount of a lactone group is bonded to the particle surface of the pigment before the treatment irrespective of the production processes of the self-dispersible pigments. Therefore, the aggregation of the pigment becomes gentle in the recording medium due to the action of the lactone group, and so a problem that bleeding or white blur is easy to occur has been caused.

SUMMARY OF THE INVENTION

Accordingly, it is an object of the present invention to provide an aqueous ink capable of recording an image that occurrence of bleeding and a white blur phenomenon is inhibited. In addition, another object of the present invention is to provide an ink cartridge and an ink jet recording method using the above aqueous ink.

The above objects can be achieved by the present invention described below. According to the present invention, there is thus provided an aqueous ink comprising a self-dispersible pigment having a carboxylic acid group bonded directly or through another atomic group to a particle surface of a pigment and a lactone group bonded to the particle surface of the pigment, wherein, as determined by a selective neutralization method, an introduced amount of the carboxylic acid group is 0.60 mmol/g or more and a ratio of an introduced amount (mmol/g) of the lactone group to the introduced amount (mmol/g) of the carboxylic acid group is 0.20 time or less.

According to the present invention, there can be provided an aqueous ink capable of recording an image that occurrence of bleeding and a white blur phenomenon is inhibited. In addition, according to another embodiment of the present invention, there can be provided an ink cartridge and an ink jet recording method using this aqueous ink.

Further features of the present invention will become apparent from the following description of exemplary embodiments with reference to the attached drawings.

BRIEF DESCRIPTION OF THE DRAWINGS

FIGS. 2A and 2B schematically illustrate an example of an ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
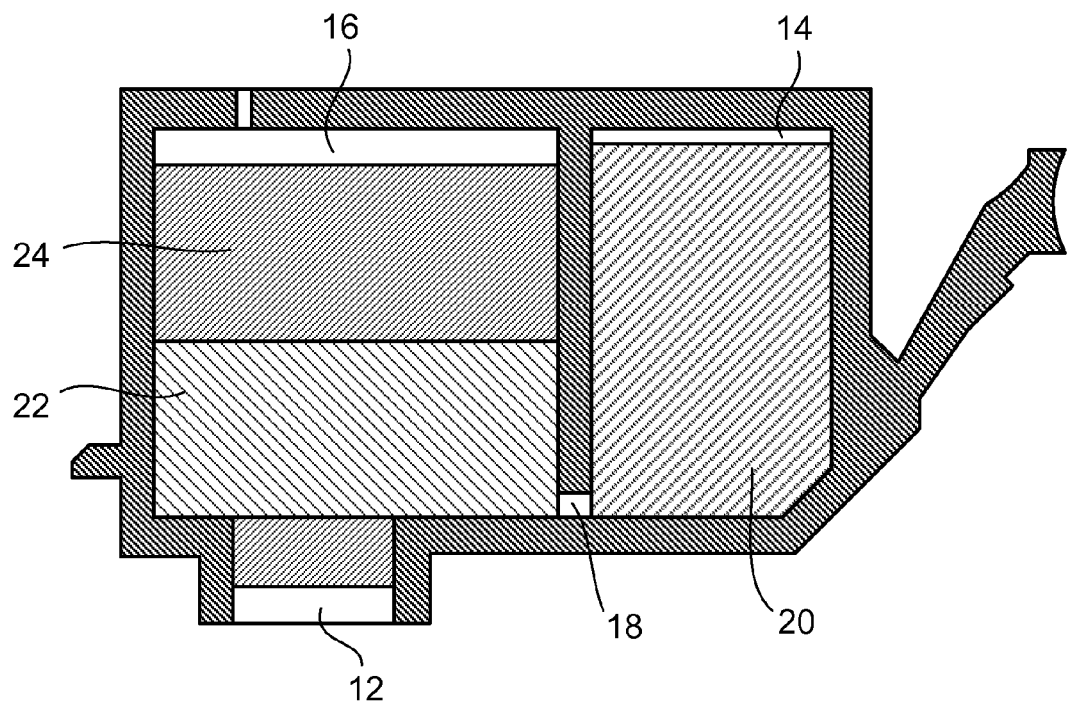
FIG. 1 is a sectional view schematically illustrating an ink cartridge according to an embodiment of the present invention.

Preferred embodiments of the present invention will now be described in detail in accordance with the accompanying drawings. However, the present invention is not limited to the following embodiments. Incidentally, when an anionic group forms a salt, the anionic group may be present in a state of being dissociated into an ion in an ink. However, such a group is represented as "anionic group" for convenience's sake in the present invention. In addition, a self-dispersible pigment and an aqueous ink may be described as "a pigment" and "an ink" merely. Various physical property values in the present specification are values at ordinary temperature (25° C.) unless expressly noted.

The present inventors have analyzed a mechanism in the process of forming an image to provide an ink capable of recording an image that occurrence of bleeding and a white blur phenomenon is inhibited. As a result, it has been concluded that the control of aggregation behavior of a self-dispersible pigment in a recording medium is important. It has thus been found that not only the composition of an ink which has heretofore been investigated from various points of view, but also properties of the self-dispersible pigment may become predominant elements of the aggregation behavior of the self-dispersible pigment.

Bleeding will be first described. The bleeding is a phenomenon caused by the fact that when an image where a region recorded by an ink containing a self-dispersible pigment and a region recorded by another ink adjoin each other is recorded, the self-dispersible pigment flows into the region recorded by another ink. When the ink is applied to a recording medium, an anion concentration in the ink relatively increases due to evaporation of water. Thus, an electric double layer formed by an anionic group by which the self-dispersible pigment is dispersed is compressed, and so repulsive force between anionic groups vanishes, and a dispersed state is unstabilized to aggregate the self-dispersible pigment. Therefore, the degree that the self-dispersible pigment flows into the region recorded by another ink is considered to depend on the size of an aggregate of the self-dispersible pigment, i.e., cohesive force.

An increase rate of an electrolyte concentration in an ink followed by evaporation of water becomes higher as the anionic group introduced to the particle surface of the pigment increases, the unstabilization of the dispersed state of the pigment by the compression of the electric double layer quickly occurs, and the cohesive force of the self-dispersible pigment also becomes strong. According to the investigation by the present inventors, it has been found that when a self-dispersible pigment in which an introduced amount of a carboxylic acid group has been controlled to 0.60 mmol/g as determined by a method which will be described subsequently is used, the cohesive force thereof becomes strong, and bleeding resistance can be improved.

The white blur phenomenon will then be described. The white blur phenomenon is a phenomenon caused by the fact that when a region where an application amount of an ink is large, such as a multi-order color image, is recorded adjoiningly to a region recorded by an ink containing a self-dispersible pigment, the self-dispersible pigment present in the vicinity of a boundary portion between these regions is allowed to sink in a recording medium.

In case of a self-dispersible pigment in which a lactone group is bonded in plenty to the particle surface of the pigment, a water molecule hydrates with the lactone group, so that the water hydrated with the particle surface of the pigment exists in plenty. The self-dispersible pigment is aggregated by vanishment of the repulsive force between anionic groups after the ink is applied to the recording medium. Here, a self-dispersible pigment formed into a large aggregate does not flow out, and so it has no effect on bleeding. However, since a water molecule in a state hydrated with the particle surface of the pigment exists, the self-dispersible pigment is easily redispersed by water supplied when another ink is applied in plenty to newly supply water. Therefore, the self-dispersible pigment allowed to somewhat sink in the vicinity of the surface of the recording medium after the ink is applied to the recording medium, and before the self-dispersible pigment aggregates is redispersed by water newly supplied when another ink is applied in plenty. In addition, the self-dispersible pigment comes to sink in the interior of the recording medium so as to be pulled by permeation of another ink applied in plenty. As a result, a self-dispersible pigment present on the surface of the recording medium becomes small in the vicinity of a boundary portion between the region recorded by the ink containing the self-dispersible pigment and the region where an application amount of the ink is large, and so the white blur phenomenon occurs.

On the other hand, in case of a self-dispersible pigment in which an amount of a lactone group bonded to the particle surface of the pigment is small, an amount of a water molecule existing in a state hydrated with the surface of a pigment particle is also small. Therefore, the self-dispersible pigment aggregated by the vanishment of the repulsive force between the anionic groups is hard to be redispersed. Thus, the self-dispersible pigment is hard to be redispersed even when a region where an application amount of an ink is large is recorded adjoiningly to the region recorded by the ink containing the self-dispersible pigment. Accordingly, even the self-dispersible pigment allowed to somewhat sink in the vicinity of the surface of the recording medium before the self-dispersible pigment aggregates does not sink in the interior of the recording medium even when another ink is applied in plenty, and water is newly supplied. As a result, no white blur phenomenon occurs.

The present inventors have investigated the properties of a self-dispersible pigment which satisfies the introduced amount of the carboxylic acid group for improving the bleeding resistance and can inhibit the white blur phenomenon. As a result, it has been found that when a self-dispersible pigment in which, as determined by a selective neutralization method which will be described subsequently, a ratio of an introduced amount of a lactone group to an introduced amount of a carboxylic acid group is 0.20 time or less is used, the white blur phenomenon can be inhibited.

As described above, it is important in the present invention to make an introduced amount of a carboxylic acid group bonded to a particle surface of a pigment large to immediately aggregate the pigment in a recording medium. In addition, it is also important in the present invention to introduce the carboxylic acid group in plenty, and on the contrary, reduce a lactone group so as to reduce water of hydration existing on the particle surface of the pigment as much as possible. The self-dispersible pigment satisfying these properties is used, whereby the occurrence of the white blur phenomenon can be inhibited while improving the bleeding resistance of an image recorded.

The self-dispersible pigment described in Japanese Patent No. 5085868 has not only a lactone group bonded to the particle surface of the pigment, but also a lactone group existing at a terminal of a functional group. In this case, the properties of the self-dispersible pigment are dominated by the action of the lactone group existing at the terminal of the functional group, and so the dispersing ability by the lactone group is retained even after the repulsive face between the anionic groups vanishes. Therefore, the aggregation of the pigment in the recording medium is inhibited, and not only the bleeding resistance is deteriorated, but also a high optical density which is a merit of using the self-dispersible pigment is not achieved.

Aqueous Ink:

Respective components making up the aqueous ink according to the present invention will hereinafter be described in detail.

Self-Dispersible Pigment:

The self-dispersible pigment contained in the ink according to the present invention has a carboxylic acid group bonded directly or through another atomic group to a particle surface of the pigment and a lactone group bonded to the particle surface of the pigment. In addition, as determined by a selective neutralization method, an introduced amount of the carboxylic acid group is 0.60 mmol/g or more and a ratio of an introduced amount (mmol/g) of the lactone group to the introduced amount (mmol/g) of the carboxylic acid group is 0.20 time or less. Such a self-dispersible pigment is used, whereby addition of a dispersant for dispersing a pigment in an ink is unnecessary, or the amount of the dispersant added can be made small. The content (% by mass) of the self-dispersible pigment in the ink is favorably 0.10% by mass or more and 15.00% by mass or less, more favorably 1.00% by mass or more and 10.00% by mass of less based on the total mass of the ink.

The carboxylic acid group is bonded directly or through another atomic group (—R—) to the particle surface of the pigment. The carboxylic acid group may be either an acid type (—COOH) or a salt type (—COOM). Here, M is an alkali metal such as lithium, sodium or potassium; ammonium ($NH_4$); or an organic ammonium such as an alkylamine whose number of carbon atoms is 1 or more and 3 or less, such as methylamine or ethylamine, or an alkanolamine whose number of carbon atoms is 1 or more and 4 or less, such as monoethanolamine, diethanolamine or triethanolamine. As examples of another atomic group (—R—), may be mentioned linear or branched alkylene groups whose number of carbon atoms is 1 or more and 12 or less; arylene groups such as a phenylene and naphthylene groups; an amide group; a sulfonyl group; an imide group; an amino group; a carbonyl group; an ester group, an ether group and groups obtained by combining these groups.

The self-dispersible pigment is favorably that having 2 or more carboxylic acid groups bonded to the particle surface of the pigment through another atomic group, i.e., that with a functional group represented by a general formula: —R—$(COOM)_n$ bonded to the particle surface of the pigment. Here, n in the general formula is favorably 2 or more and 5 or less, more favorably 2 or more and 3 or less, particularly favorably 2 though it varies according to the structure of R. "—R—" is favorably an arylene group, more favorably a phenylene group. M is an alkali metal, ammonium ($NH_4$) or an organic ammonium. The functional group represented by the general formula: —R—$(COOM)_n$ is favorably a phthalic group. When the functional group bonded to the particle surface of the pigment is a phthalic group, and a pigment species is carbon black having a DBP oil absorption of 120 ml/100 g, a particularly high optical density can be achieved.

Since the self-dispersible pigment with the functional group represented by the general formula: —R—$(COOM)_n$ bonded to the particle surface of the pigment is such that the introduced amount of the carboxylic acid group is large, and the functional group has a sterically bulky structure, an area of a particle surface of a pigment exposed without having the functional group becomes narrow. Thus, a water-soluble organic solvent is hard to solvate with the self-dispersible pigment with such a functional group bonded to the particle surface of the pigment. Accordingly, when an ink containing such a self-dispersible pigment is applied to a recording medium, the water-soluble organic solvent and the pigment in the ink extremely quickly undergo solid-liquid separation. In addition, an ink containing the self-dispersible pigment hard to solvate with the water-soluble organic solvent can record an image high in optical density because dispersion stability of the pigment by solvation is low, and the pigment more markedly aggregates in a recording medium.

As described above, the introduced amount of the carboxylic acid group is controlled to 0.60 mmol/g or more from the viewpoint of inhibiting bleeding. When the introduced amount is less than 0.60 mmol/g, bleeding resistance cannot be achieved, and the optical density also tends to be somewhat lowered. The introduced amount of the carboxylic acid group is favorably 1.50 mmol/g or less.

The lactone group is bonded directly to the particle surface of the pigment making up the self-dispersible pigment. In order to inhibit the white blur phenomenon, the ratio of the introduced amount of the lactone group to the introduced amount of the carboxylic acid group (introduced amount of the lactone group/introduced amount of the carboxylic acid group) must be controlled to 0.20 time or less as described above. The introduced amount of the lactone group is lessened to some extent, whereby the effect to inhibit the white blur phenomenon can be achieved at a higher level. Therefore, the introduced amount of the lactone group is favorably 0.18 mmol/g or less. The introduced amount of the lactone group favorably exceeds 0.00 mmol/g.

Pigment Species and Physical Property Values:

As for the pigment constituting the self-dispersible pigment (pigment species), for example, an inorganic pigment such as carbon black, calcium carbonate and titanium oxide, or an organic pigment such as azo, phthalocyanine and quinacridone may be used. Among these, carbon black or the organic pigment is favorably used, and carbon black is particularly favorably used as the pigment because it has more reaction active points on its particle surface than other pigments, and so the introduced amount of the functional group is easy to be increased. As carbon black, any carbon black such as furnace black, lamp black, acetylene black and channel black may be used.

The DBP oil absorption of carbon black is favorably 50 ml/100 g or more and 200 ml/100 g or less, more favorably 120 ml/100 g or more and 170 ml/100 g or less, particularly favorably 120 ml/100 g or more and 150 ml/100 g or less. The DBP oil absorption can be measured by a method conforming to JIS K 6221 or ASTM D 2414. These methods are those in which dibutyl phthalate is added dropwise to 100 g of carbon black under agitation, and then the amount of dibutyl phthalate added is measured at the point of time of the maximum torque. In the present invention, the DBP oil absorption of the pigment such as carbon black is favorably 120 ml/100 g or more because the aggregate of the pigment becomes bulky, and the optical density of the resulting image can be improved.

The specific surface area of carbon black according to the BET method is favorably 100 $m^2/g$ or more and 600 $m^2/g$ or less. The specific surface area according to the BET method can be measured by a method conforming to JIS K 6217 or ASTM D 6556. These methods are those in which deaerated carbon black is immersed in liquid nitrogen, and then the amount of nitrogen adsorbed on a particle surface of carbon black is measured when having reached the equilibrium.

The primary particle size of carbon black is favorably 10 nm or more and 40 nm or less. Carbon black is generally present in such a state that plural primary particles sterically extend like a bunch of grapes. The primary particle size means a particle size of carbon black (primary particle) of the smallest unit forming one pigment particle. The primary particle size of carbon black can be determined by observing and measuring the particle size of carbon black of the smallest unit forming the pigment particle at about 100 points through a transmission or scanning type electron microscope and calculating the arithmetical mean thereof.

The average particle size of carbon black is favorably 50 nm or more and 200 nm or less. The average particle size means a particle size of carbon black as an ordinarily existing form. In the present invention, the average particle size can be measured as a 50% cumulative value [$D_{50}$ (nm)] in a volume-based particle size distribution by using a dynamic light scattering type particle size distribution measuring device or the like.

The primary particle size of the organic pigment is favorably 50 nm or more and 150 nm or less. In addition, the average particle size of the organic pigment is favorably 50 nm or more and 250 nm or less. The definitions of the primary particle size and average particle size of the organic pigment are the same as the definitions of the primary particle size and average particle size of carbon black, respectively.

Measuring Method of Introduced Amount of Functional Group; Selective Neutralization Method:

A method of measuring a concentration of a counter ion of an anionic group to convert it to an introduced amount of the anionic group and a method of measuring an introduced amount of an anionic group on a particle surface of a pigment in a dispersed state by a titration method have heretofore been utilized as a measuring method of an introduced amount of a functional group of a self-dispersible pigment. However, these methods cannot measure an introduced amount of a lactone group which is a nonionic hydrophilic group bonded to the particle surface of the pigment.

In the present invention, the introduced amounts of the carboxylic acid group and the lactone group in the self-dispersible pigment are determined by a selective neutralization method. The selective neutralization method is a method in which neutralization titration is conducted with basic substances different in strength by utilizing the fact that the dissociation constants of an anionic functional group and a nonionic functional group are different from each other to determine a functional group introduced to a particle surface of a pigment. As described above, the ink according to the present invention utilizes the action by surface characteristics of the self-dispersible pigment, so that it is appropriate to specify the surface characteristics of the self-dispersible pigment by the introduced amount of the functional group determined by the selective neutralization method.

The method for measuring the introduced amount of the functional group by the selective neutralization method by using a pigment dispersion liquid as a sample will hereinafter be described. Quite naturally, the introduced amount of the functional group can also be measured by dispersing a self-dispersible pigment taken out of an ink by a proper method in water and using the resultant dispersion liquid as a sample.

(1) An acid is added to the pigment dispersion liquid to adjust its pH to 2 or less, and agitation is conducted for 24 hours at ordinary temperature (25° C.) to precipitate a pigment.

(2) A supernatant liquid is removed by centrifugation to collect the pigment (solids).

(3) After the pigment collected is sufficiently dried, the dried pigment is grinded in an agate mortar to prepare a sample.

(4) A predetermined amount of an aqueous solution of a basic compound whose concentration is known is added to the sample weighed out, and agitation is conducted for hours to neutralize a functional group which is a measurement object (selective neutralization).

(5) A supernatant liquid is collected by centrifugation to determine the basic substance which has not been used in the neutralization by neutralization titration with an acid whose concentration is known.

(6) The same amount as the aqueous solution used in the selective neutralization in the above (4) of an aqueous solution (blank) of a basic compound whose concentration is known is subjected to neutralization titration with an acid whose concentration is known to determine the basic compound.

(7) A difference between the quantitative values in the above (6) and (5) is regarded as an amount (mmol) of the basic compound used in the selective neutralization, and such a value is converted to a value per gram of the pigment to determine the introduced amount (mmol/g) of the functional group which is the measurement object.

When sodium hydrogencarbonate is used as the basic compound in the selective neutralization method for the pigment, a carboxylic acid group can be determined. In addition, when sodium carbonate is used as the basic compound, the total amount of a carboxylic acid group and a lactone group can be determined. Accordingly, the quantitative value of the lactone group is a value obtained by subtracting the quantitative value (carboxylic acid group) by sodium hydrogencarbonate from the quantitative value (carboxylic acid group+lactone group) by sodium carbonate.

Production Process for Self-Dispersible Pigment:

The self-dispersible pigment contained in the ink according to the present invention requires that an introduced amount of a carboxylic acid group is 0.60 mmol/g or more, and a ratio of an introduced amount (mmol/g) of a lactone group to the introduced amount (mmol/g) of the carboxylic acid group is 0.20 time or less. No limitation is imposed on the production process for the self-dispersible pigment so far as the resulting self-dispersible pigment is a self-dispersible pigment satisfying these conditions, and a self-dispersible pigment produced by any process may also be used. As described above, the self-dispersible pigments are roughly divided into an oxidation type and a surface modification type according to the production processes thereof.

As examples of the production process for the oxidation type self-dispersible pigment, may be mentioned a method of oxidizing a pigment with an oxidizing agent such as hypochlorous acid; a method of oxidizing a pigment with ozone in water; and a method of oxidizing a pigment with an oxidizing agent after an ozone treatment. However, when the self-dispersible pigment is produced by the oxidation, a lactone group inevitably increases in the process of oxidizing a particle surface of a pigment. It is thus difficult to produce a self-dispersible pigment with the ratio of the introduced amount of the lactone group to the introduced amount of the carboxylic acid group suitably controlled.

As examples of the production process for the surface modification type self-dispersible pigment, may be mentioned a method of chemically treating a pigment by using a compound having an anionic group, such as a diazonium salt, a diazene compound or a substituted triazine compound as a treatment agent. In some cases, however, the method using the compound having the anionic group, such as the diazonium salt or the substituted triazine compound may also be difficult like the oxidation method to produce a self-dispersible pigment with the ratio of the introduced amount of the lactone group to the introduced amount of the carboxylic acid group suitably controlled.

The self-dispersible pigment used in the ink according to the present invention is favorably a self-dispersible pigment obtained by a surface modifying method including an oxidative radical addition reaction step induced by removal of a hydrogen atom from a diazene compound ($HN=N-R_1$). In this process, the particle surface of a pigment is subjected to reduction in the process of bonding a functional group (group $R_1$ in the above general formula) containing a carboxylic acid group, so that the amount of the lactone group existing on the surface of the pigment before the treatment does not very increase or may be reduced in some cases. Accordingly, this process is easy compared with the oxidation method to obtain a self-dispersible pigment with the introduced amount of the carboxylic acid group and the ratio of the introduced amount of the lactone group to the introduced amount of the carboxylic acid group suitably controlled. $R_1$ in the general formula: $HN=N-R_1$ representing the diazene compound used in this process is a group having at least one of an aliphatic group and an aromatic group and being substituted with a carboxylic acid group.

The production process for the self-dispersible pigment using a hydrazine compound will be described. This production process has a step of bonding a group $R_1$ in the following general formula (1) to a particle surface of a pigment by a radical addition reaction induced by removal of a hydrogen atom from a compound represented by the general formula (1).

$$HN=N-R_1 \quad (1)$$

wherein $R_1$ is a group having at least one of an aliphatic group and an aromatic group and being substituted with a carboxylic acid group.

The compound represented by the general formula (1) can be formed by removal of a hydrogen atom from a compound represented by the following general formula (2) (hydrazine compound). That is, a self-dispersible pigment can also be produced by a radical addition reaction induced by sequential removal of a hydrogen atom from the compound represented by the general formula (2).

$$H_2N-NH-R_1 \quad (2)$$

wherein $R_1$ is a group having at least one of an aliphatic group and an aromatic group and being substituted with a carboxylic acid group.

An estimated mechanism of a reaction used in this production process is shown below. The description will hereinafter be made taking a case where a compound represented by the general formula (2) is used as the treatment agent and carbon black is used as the pigment, and potassium hexacyanoferrate(III) is used as an oxidizing agent, as an example. Incidentally, the oxidized species and reduced species of potassium hexacyanoferrate(III) used as the oxidizing agent are expressed as $Fe^{3+}$ and $Fe^{2+}$, respectively.

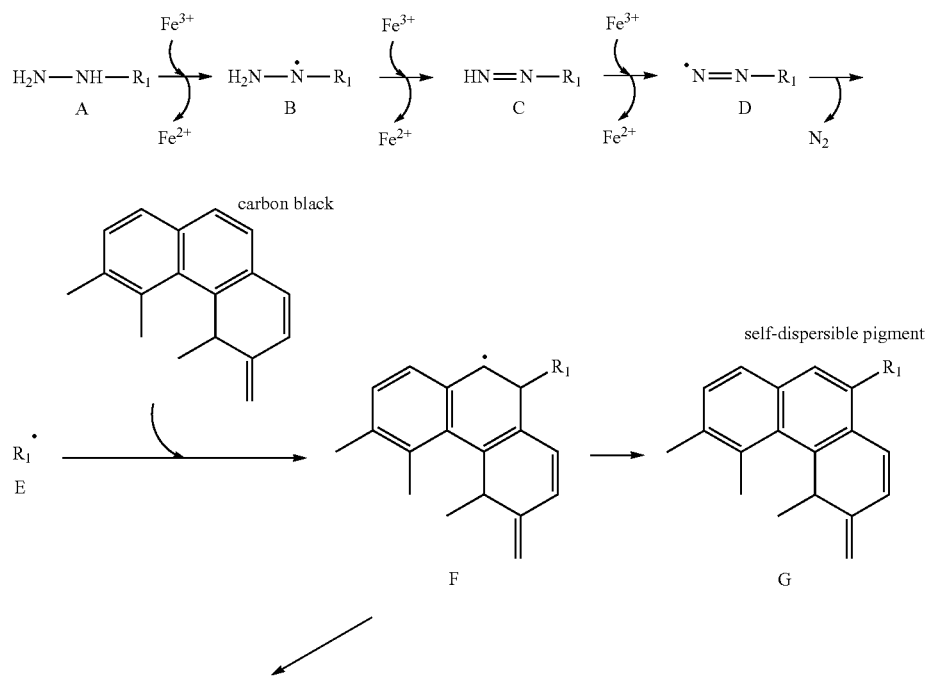

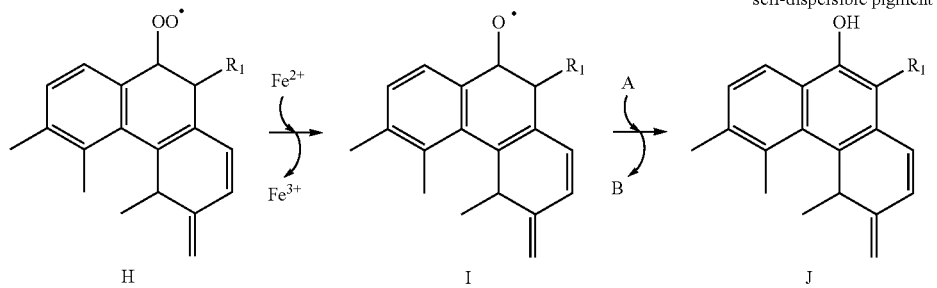

First, a hydrogen atom is removed from a compound A which is a hydrazine compound (compound represented by the general formula (2)) by the action of the oxidizing agent ($Fe^{3+}$), and thus the compound A is radically oxidized to form a hydrazyl radical B. A hydrogen atom is then removed from the hydrazyl radical B by the action of the oxidizing agent ($Fe^{3+}$) to form a compound C which is a diazene compound (compound represented by the general formula (1)). A hydrogen atom is further removed from the compound C by the action of the oxidizing agent ($Fe^{3+}$) to form a diazene radical D. The diazene radical D instantly gives rise to denitrification to form a radical species E. The radical species E then causes radical addition to an aromatic carbon atom on a particle surface of carbon black, whereby $R_1$ is bonded to the particle surface of carbon black through a radical intermediate F to obtain a self-dispersible pigment G.

When an oxidizing agent whose valence is liable to vary, such as potassium hexacyanoferrate(III), is used in the production process according to the present invention, another addition reaction than the above may occur in parallel in some cases. That is, at the same time when the radical species E causes radical addition to the aromatic carbon atom on the particle surface of carbon black to form the radical intermediate F, the radical is captured by an oxygen molecule, thereby forming a radical intermediate H. In this case, after the radical intermediate H is reduced by the action of a reducing species ($Fe^{2+}$) of the oxidizing agent, a self-dispersible pigment J which is in the form of an alcohol is obtained through an oxygen radical intermediate I.

The compound represented by the general formula (1) which is used as the treatment agent is a diazene compound substituted with a carboxylic acid group. The compound represented by the general formula (1) can be obtained by, for example, removal of a hydrogen atom from the compound represented by the general formula (2). That is, a group $R_1$ can be bonded to a particle surface of a pigment through the compound represented by the general formula (1) by sequential removal of a hydrogen atom from the compound represented by the general formula (2). Therefore, in the present invention, the compound represented by the general formula (2) is also included in the treatment agent used for the treatment of the pigment. The compound represented by the general formula (2) is a compound having a hydrazino group (—NH—$NH_2$) and a carboxylic acid group, and acid addition salts such as hydrazine sulfate and hydrazine hydrochloride, and hydrates thereof are also included therein.

$$HN{=}N{-}R_1 \quad (1)$$

$$H_2N{-}NH{-}R_1 \quad (2)$$

As the aliphatic group, may be mentioned an alkyl group. The alkyl group may be any of linear, branched and cyclic chains. The linear and branched alkyl groups may have an unsaturated bond between carbon atoms, and the number of carbon atoms thereof is favorably of the order of 1 or more and 12 or less. In addition, the cyclic alkyl group may be any of a single ring and a complex (fused) ring. The number of elements making up a ring is favorably of the order of 3 or more and 8 or less. As the aromatic group, may be mentioned an aryl group or a heteroaryl group. The aryl and heteroaryl groups may be any of a single ring and a complex (fused) ring, and the number of elements making up a ring is favorably of the order of 3 or more and 8 or less. As examples of the group having an aliphatic group and an aromatic group, may be mentioned groups in which the above-mentioned groups are directly or through a general linker structure such as —O—, —NH—, —CO—, —COO—, —CONH—, —N=N—, —SO— and —$SO_2$—. In order to improve the hydrophilicity of the functional group, it is more favorable to let the group having the aliphatic group and the aromatic group have the linker structure.

In the production process described above, the self-dispersible pigment can also be produced by conducting the removal of the hydrogen atom in the presence of an oxidizing agent for improving the reaction velocity. When the compounds represented by the general formulae (1) and (2) are present, the oxidizing agent is scarcely consumed for oxidation of the pigment because it is selectively consumed for the removal of the hydrogen atom. As examples of the oxidizing agent, may be mentioned halogens, oxoacid compounds, metal oxides, metal halide compounds, metal porphyrin compounds, hexacyanometalate compounds, metal nitrates, hydrogen peroxide and nitric acid. When an oxidizing agent whose valence is easy to vary among the oxidizing agents is used, the self-dispersible pigment J which is in the form of an alcohol is oxidized to form a lactone group to increase the lactone group on the particle surface of the pigment. Accordingly, the kind of the oxidizing agent is favorably selected on the basis of the balance with the reaction velocity. As examples of the oxidizing agent whose valence is easy to vary, may be mentioned metal halide compounds of at least one metal selected from the group consisting of Fe, Co, Ni, Cu, Mg, Mn, Cr and Mo, metal porphyrin compounds and hexacyanometalate compounds.

The production process described above is favorably conducted in a liquid medium such as water. No particular limitation is imposed on the pH and temperature of the reaction system. For example, the pH is favorably 1 or more and 13 or less, more favorably 2 or more and 7 or less. The temperature is −5° C. or more and 100° C. or less, more favorably 20° C. or more and 80° C. or less.

Aqueous Medium:

In the ink according to the present invention, water or an aqueous medium which is a mixed solvent of water and a water-soluble organic solvent may be used. In the present invention, an aqueous ink containing at least water as an aqueous medium is favorably provided. Deionized water (ion-exchanged water) is favorably used as the water. The content (% by mass) of water in the ink is favorably 10.00% by mass or more and 90.00% by mass or less, more favorably 50.00% by mass or more and 90.00% by mass or less based on the total mass of the ink.

No particular limitation is imposed on the water-soluble organic solvent so long as it is soluble in water, and then an alcohol, a polyhydric alcohol, a polyglycol, a nitrogen-containing polar solvent or a sulfur-containing polar solvent may be used. Among these, a water-soluble organic solvent having a lower vapor pressure at 25° C. than water is favorably used. The content (% by mass) of the water-soluble organic solvent in the ink is favorably 5.00% by mass or more and 90.00% by mass or less, more favorably 10.00% by mass or more and 50.00% by mass or less based on the total mass of the ink.

Other Additives:

The ink according to the present invention may also contain a water-soluble organic compound which is solid at ordinary temperature, such as a polyhydric alcohol such as trimethylolpropane and trimethylolethane, urea, a urea derivative such as ethyleneurea and hydantoin, or a sugar, as needed, in addition to the above-described components. In addition, the ink according to the present invention may also contain various additives such as a surfactant, a pH adjustor, a rust preventive, a preservative, a mildewproofing agent, an antioxidant, an antireductant, an evaporation accelerating agent, a chelating agent and a water-soluble resin, as needed.

A nonionic surfactant such as a polyoxyethylene alkyl ether, a polyoxyethylene fatty acid ester, a polyoxyethylene alkyl phenyl ether, a polyoxyethylene-polyoxypropylene block copolymer or an acetylene glycol-based compound is favorably used as the surfactant. Among these, an acetylene glycol-based nonionic surfactant such as an acetylene glycol ethylene oxide adduct is favorable because of its excellent bleeding resistance. The content of the nonionic surfactant in the ink is favorably 0.05% by mass or more and 2.00% by mass or less, more favorably 0.05% by mass or more and 1.00% by mass or less based on the total mass of the ink.

Physical Properties of Ink:

In the case where the ink according to the present invention is applied to an ink jet system, it is favorable to suitably control the physical property values thereof. Specifically, the surface tension of the ink at 25° C. is favorably 10 mN/m or more and 60 mN/m or less, more favorably 20 mN/m or more and 60 mN/m or less. In particular, the surface tension is favorably 30 mN/m or more and 50 mN/m or less, more favorably 30 mN/m or more and 40 mN/m or less. The viscosity of the ink at 25° C. is favorably 1.0 mP·s or more and 10.0 mP·s or less, more favorably 1.0 mP·s or more and 5.0 mP·s or less, particularly favorably 1.0 mP·s or more and 3.0 mP·s or less. The pH of the ink at 25° C. is favorably 5 or more and 9 or less.

Ink Cartridge:

The ink cartridge according to the present invention is provided with an ink and an ink storage portion storing this ink. The ink stored in this ink storage portion is the above-described ink according to the present invention. FIG. 1 is a sectional view schematically illustrating an ink cartridge according to an embodiment of the present invention. As illustrated in FIG. 1, an ink supply port 12 for supplying the ink to a recording head is provided in a bottom surface of the ink cartridge. The interior of the ink cartridge is the ink storage portion for storing the ink. The ink storage portion is constituted by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber storing the liquid ink. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method:

The ink jet recording method according to the present invention is a method of ejecting the above-described ink according to the present invention from a recording head of an ink jet system to record an image on a recording medium. As systems for ejecting the ink, a system in which mechanical energy is applied to the ink and a system in which thermal energy is applied to the ink are mentioned. In the present invention, the system in which the thermal energy is applied to the ink to eject the ink is particularly favorably adopted. Steps of the ink jet recording method may be those publicly known except that the ink according to the present invention is used.

Figure 2A:
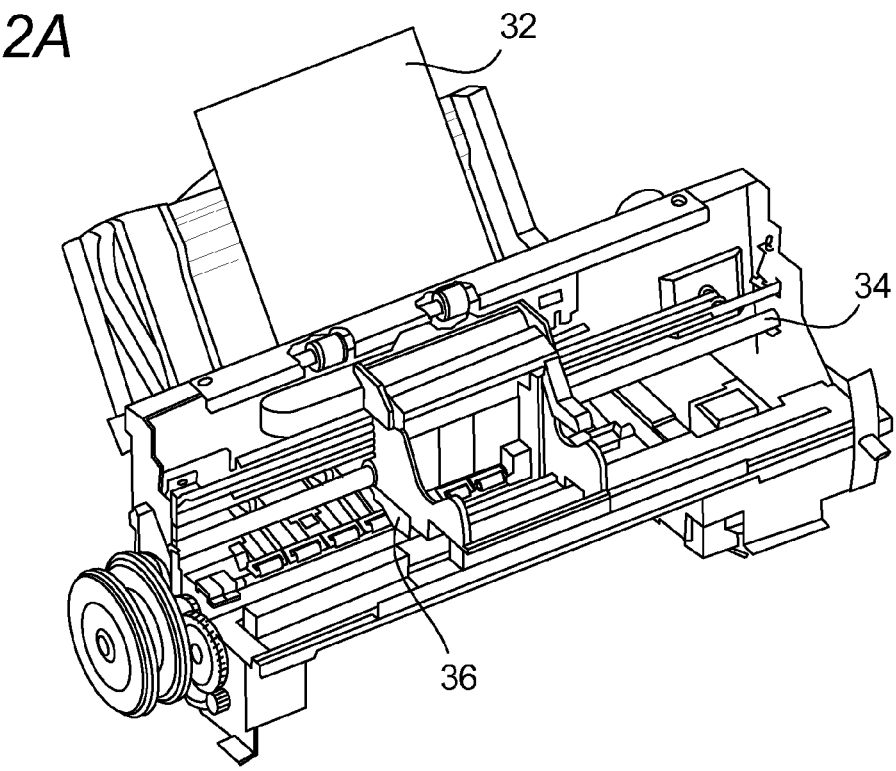
Figure 2B:
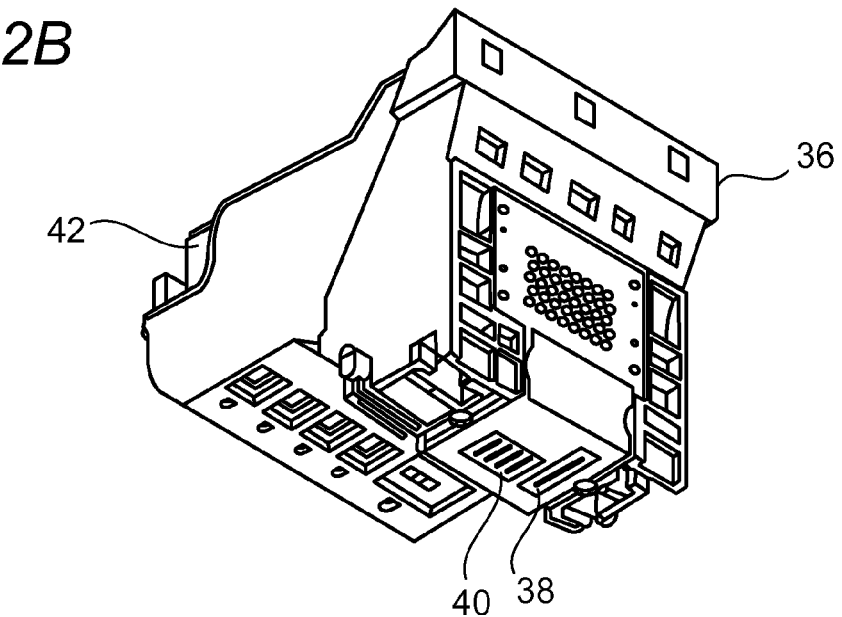

FIGS. 2A and 2B schematically illustrate an example of an ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be mounted on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a primary scanning direction along the carriage shaft 34. The recording medium 32 is then conveyed in a secondary scanning direction by the conveyance unit (not illustrated), whereby an image is recorded on the recording medium 32.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components are based on mass unless expressly noted.

Preparation of Treatment Agent:

As the treatment agents, the following compounds were used:

4-Hydrazinophthalic acid hydrochloride: product of Chem Genesis Inc.;

4-Hydrazinobenzoic acid: product of TOKYO CHEMICAL INDUSTRY CO., LTD.;

4-Hydrazinobenzenesulfonic acid: product of TOKYO CHEMICAL INDUSTRY CO., LTD.; and P,P'-[[(4-Hydrazinobenzyl)amino]methylene]bisphosphonic acid hydrochloride: product of Sumika Technoservice Corporation.

Measurements of Introduced Amounts of Lactone Group and Carboxylic Acid Group:

The introduced amounts of the lactone group and the carboxylic acid group of the self-dispersible pigment were measured according to the following procedure using a pigment dispersion liquid. First, the measuring method of the introduced amount of the carboxylic acid group will be described. Into a pigment dispersion liquid was added 1.0 mol/l hydrochloric acid to adjust its pH to 2 or less, and agitation was conducted for 24 hours at 25° C. to precipitate a pigment. After centrifugation was conducted for 30 minutes at 5,000 rpm, a supernatant liquid is removed to collect the pigment. After the pigment collected was dried for 24 hours in an oven controlled to 60° C., the dried pigment was grinded in an agate mortar to prepare a sample. 30.0 grams of a 0.1 mol/l aqueous solution of sodium hydrogencarbonate was added to 0.5 g of the sample (pigment) prepared, and agitation was conducted for 24 hours to conduct selective neutralization of a carboxylic acid group. After centrifugation was conducted for 60 minutes at 80,000 rpm, a supernatant liquid was collected. Sodium hydrogen carbonate (which had not been consumed in the neutralization) contained in the liquid collected was determined by neutralization titration with 0.1 mol/l hydrochloric acid (regarded as A mol). As a blank, was prepared 30.0 g of 0.1 mol/l aqueous solution of sodium hydrogencarbonate, and sodium hydrogencarbonate in this blank was subjected to neutralization titration with 0.1 mol/l hydrochloric acid to determine it (regarded as B mol). A difference (A−B) between the quantitative values A and B obtained above was regarded as an amount of sodium hydrogencarbonate used in the selective neutralization, and such a value was converted to a value per gram of the pigment to determine the introduced amount C (mmol/g) of the carboxylic acid group.

The measuring method of the introduced amount of the lactone group will now be described. The total introduced amount T (mmol/g) of the carboxylic acid group and the lactone group was determined according to the same procedure as in the measuring method of the carboxylic acid group described above with the exception that sodium carbonate was used in place of sodium hydrogencarbonate. The introduced amount L (mmol/g) of the lactone group was determined by subtracting the introduced amount C (mmol/g) of the carboxylic acid group from this total introduced amount T (mmol/g).

Preparation of Pigment Dispersion Liquid:

Pigment Dispersion Liquid 1

100.0 grams of carbon black, 800.0 g of ion-exchanged water, 20.0 g (0.86 mmol per gram of the pigment) of 4-hydrazinophthalic acid hydrochloride and 4.0 g of potassium ferrocyanide ($K_6[Fe(CN)_4] \cdot 3H_2O$) were provided. These were placed in a 2-liter plastic container and agitated for 10 minutes to obtain a mixture. Carbon black (trade name "NIPEX 170IQ", product of Orion Engineered Carbons) having a specific surface area of 200 $m^2/g$ and a DBP oil absorption of 135 ml/100 g was used. The pH of the mixture was adjusted with an 8 mol/l aqueous solution of potassium hydroxide. The mixture was then agitated for 4 hours under conditions that the number of rotor revolutions was 15,000 rpm, the number of screen revolutions was 13,000 rpm, and the temperature was 25° C. by means of a homogenizer (trade name "CLEARMIX W-Motion", manufactured by M Technique Co., Ltd.) to obtain a dispersion liquid. An operation that 800.0 g of the resultant dispersion liquid is diluted with 4,000.0 g of ion-exchanged water, and the diluted dispersion liquid is concentrated by means of an ultrafilter membrane until the dispersion liquid is reduced to 800.0 g and purified by removing impurities was repeated until the electrical conductivity of a filtrate reached 50 μS/cm or lower to purify the dispersion liquid. Trade name "OS300C11" (molecular weight cutoff: 300 K, product of Pall Corporation) was used as the ultrafilter membrane. After the purified dispersion liquid was centrifuged for 15 minutes at the number of revolutions of 5,000 rpm by means of a centrifugal separator (trade name "CR-21G", manufactured by Hitachi Koki Co., Ltd.) to remove coarse particles, the dispersion liquid was diluted with ion-exchanged water to obtain Pigment Dispersion Liquid 1 in which the content of the pigment was 10.0%. The self-dispersible pigment in the resultant Pigment Dispersion Liquid 1 was such that the introduced amount L of the lactone group is 0.13 mmol/g, the introduced amount C of the carboxylic acid group is 0.75 mmol/g, and L/C is 0.17.

Pigment Dispersion Liquid 2

Pigment Dispersion Liquid 2 in which the content of the pigment was 10.0% was obtained in the same manner as in the preparation of Pigment Dispersion Liquid 1 with the exception that no potassium ferrocyanide was used. The self-dispersible pigment in the resultant Pigment Dispersion Liquid 2 was such that the introduced amount L of the lactone group is 0.12 mmol/g, the introduced amount C of the carboxylic acid group is 0.78 mmol/g, and L/C is 0.15.

Pigment Dispersion Liquid 3

Pigment Dispersion Liquid 3 in which the content of the pigment was 10.0% was obtained in the same manner as in the preparation of Pigment Dispersion Liquid 1 with the exception that 35.6 g (2.34 mmol per gram of the pigment) of 4-hydrazinobenzoic acid was used in place of 4-hydrazino-phthalic acid hydrochloride. The self-dispersible pigment in the resultant Pigment Dispersion Liquid 3 was such that the introduced amount L of the lactone group is 0.10 mmol/g, the introduced amount C of the carboxylic acid group is 0.66 mmol/g, and L/C is 0.15.

Pigment Dispersion Liquid 4

Pigment Dispersion Liquid 4 in which the content of the pigment was 10.0% was obtained in the same manner as in the preparation of Pigment Dispersion Liquid 1 with the exception that the amount of 4-hydrazinophthalic acid hydrochloride was changed to 15.5 g (0.67 mmol per gram of the pigment). The self-dispersible pigment in the resultant Pigment Dispersion Liquid 4 was such that the introduced amount L of the lactone group is 0.10 mmol/g, the introduced amount C of the carboxylic acid group is 0.60 mmol/g, and L/C is 0.17.

Pigment Dispersion Liquid 5

Pigment Dispersion Liquid 5 in which the content of the pigment was 10.0% was obtained in the same manner as in the preparation of Pigment Dispersion Liquid 1 with the exception that 30.4 g (2.00 mmol per gram of the pigment) of 4-hydrazinobenzoic acid was used in place of 4-hydrazino-phthalic acid hydrochloride. The self-dispersible pigment in the resultant Pigment Dispersion Liquid 5 was such that the introduced amount L of the lactone group is 0.09 mmol/g, the introduced amount C of the carboxylic acid group is 0.60 mmol/g, and L/C is 0.15.

Pigment Dispersion Liquid 6

Pigment Dispersion Liquid 6 in which the content of the pigment was 10.0% was obtained in the same manner as in the preparation of Pigment Dispersion Liquid 1 with the exception that the time of the treatment using the homogenizer was changed to 2 hours. The self-dispersible pigment in the resultant Pigment Dispersion Liquid 6 was such that the introduced amount L of the lactone group is 0.13 mmol/g, the introduced amount C of the carboxylic acid group is 0.64 mmol/g, and L/C is 0.20.

Pigment Dispersion Liquid 7

Pigment Dispersion Liquid 7 in which the content of the pigment was 10.0% was obtained in the same manner as in the preparation of Pigment Dispersion Liquid 1 with the exception that 35.6 g (2.34 mmol per gram of the pigment) of 4-hydrazinobenzoic acid was used in place of 4-hydrazino-phthalic acid hydrochloride, and the time of the treatment using the homogenizer was changed to 2 hours in the preparation of Pigment Dispersion Liquid 1. The self-dispersible pigment in the resultant Pigment Dispersion Liquid 7 was such that the introduced amount L of the lactone group is 0.13 mmol/g, the introduced amount C of the carboxylic acid group is 0.64 mmol/g, and L/C is 0.20.

Pigment Dispersion Liquid 8

Pigment Dispersion Liquid 8 in which the content of the pigment was 10.0% was obtained in the same manner as in the preparation of Pigment Dispersion Liquid 1 with the exception that the amount of 4-hydrazinophthalic acid hydrochloride was changed to 20.0 g (0.86 mmol per gram of the pigment), and carbon black (trade name "Printex L6", product of Orion Engineered Carbons) having a specific surface area of 265 $m^2/g$ and a DBP oil absorption of 120 ml/100 g was used in the preparation of Pigment Dispersion Liquid 1. The self-dispersible pigment in the resultant Pigment Dispersion Liquid 8 was such that the introduced amount L of the lactone group is 0.13 mmol/g, the introduced amount C of the carboxylic acid group is 0.70 mmol/g, and L/C is 0.19.

Pigment Dispersion Liquid 9

Pigment Dispersion Liquid 9 in which the content of the pigment was 10.0% was obtained in the same manner as in the preparation of Pigment Dispersion Liquid 1 with the exception that 35.6 g (2.34 mmol per gram of the pigment) of 4-hydrazinobenzoic acid was used in place of 4-hydrazino-phthalic acid hydrochloride, and carbon black (trade name "Printex L6", product of Orion Engineered Carbons) having a specific surface area of 265 $m^2/g$ and a DBP oil absorption of 120 ml/100 g was used in the preparation of Pigment Dispersion Liquid 1. The self-dispersible pigment in the resultant Pigment Dispersion Liquid 9 was such that the introduced amount L of the lactone group is 0.10 mmol/g, the introduced amount C of the carboxylic acid group is 0.62 mmol/g, and L/C is 0.16.

Pigment Dispersion Liquid 10

Pigment Dispersion Liquid 10 in which the content of the pigment was 10.0% was obtained in the same manner as in the preparation of Pigment Dispersion Liquid 1 with the exception that carbon black (trade name "Black Pearls 880", product of Cabot) having a specific surface area of 220 $m^2/g$ and a DBP oil absorption of 105 ml/100 g was used in the preparation of Pigment Dispersion Liquid 1. The self-dispersible pigment in the resultant Pigment Dispersion Liquid 10 was such that the introduced amount L of the lactone group is 0.11 mmol/g, the introduced amount C of the carboxylic acid group is 0.61 mmol/g, and L/C is 0.18.

Pigment Dispersion Liquid 11

Pigment Dispersion Liquid 11 in which the content of the pigment was 10.0% was obtained in the same manner as in the preparation of Pigment Dispersion Liquid 1 with the exception that carbon black (trade name "Black Pearls 880", product of Cabot) having a specific surface area of 220 $m^2/g$ and a DBP oil absorption of 105 ml/100 g was used, the amount of 4-hydrazinophthalic acid hydrochloride was changed to 24.0 g (1.03 mmol per gram of the pigment), and the time of the treatment using the homogenizer was changed to 2 hours in the preparation of Pigment Dispersion Liquid 1. The self-dispersible pigment in the resultant Pigment Dispersion Liquid 11 was such that the introduced amount L of the lactone group is 0.18 mmol/g, the introduced amount C of the carboxylic acid group is 0.88 mmol/g, and L/C is 0.20.

Pigment Dispersion Liquid 12

Pigment Dispersion Liquid 12 in which the content of the pigment was 10.0% was obtained in the same manner as in the preparation of Pigment Dispersion Liquid 1 with the exception that carbon black (trade name "Black Pearls 1000", product of Cabot) having a specific surface area of 343 $m^2/g$ and a DBP oil absorption of 105 ml/100 g was used, and 35.6 g (2.34 mmol per gram of the pigment) of 4-hydrazinobenzoic acid was used in place of 4-hydrazino-phthalic acid hydrochloride in the preparation of Pigment Dispersion Liquid 1. The self-dispersible pigment in the resultant Pigment Dispersion Liquid 12 was such that the introduced amount L of the lactone group is 0.13 mmol/g, the introduced amount C of the carboxylic acid group is 0.67 mmol/g, and L/C is 0.19.

Pigment Dispersion Liquid 13

Pigment Dispersion Liquid 13 in which the content of the pigment was 10.0% was obtained in the same manner as in the preparation of Pigment Dispersion Liquid 1 with the exception that carbon black (trade name "Black Pearls 880", product of Cabot) having a specific surface area of 220 $m^2/g$ and a DBP oil absorption of 105 ml/100 g was used, and 35.6 g (2.34 mmol per gram of the pigment) of 4-hydrazinobenzoic acid was used in place of 4-hydrazino-phthalic acid hydrochloride in the preparation of Pigment Dispersion Liquid 1. The self-dispersible pigment in the resultant Pigment Dispersion Liquid 13 was such that the introduced amount L of the lactone group is 0.09 mmol/g, the introduced amount C of the carboxylic acid group is 0.50 mmol/g, and L/C is 0.18.

Pigment Dispersion Liquid 14

Pigment Dispersion Liquid 14 in which the content of the pigment was 10.0% was obtained in the same manner as in the preparation of Pigment Dispersion Liquid 1 with the exception that the amount of 4-hydrazinophthalic acid hydrochloride was changed to 15.8 g (0.68 mmol per gram of the pigment), and the time of the treatment using the homogenizer was changed to 2 hours. The self-dispersible pigment in the resultant Pigment Dispersion Liquid 14 was such that the introduced amount L of the lactone group is 0.11 mmol/g, the introduced amount C of the carboxylic acid group is 0.58 mmol/g, and L/C is 0.19.

Pigment Dispersion Liquid 15

Pigment Dispersion Liquid 15 in which the content of the pigment was 10.0% was obtained in the same manner as in the preparation of Pigment Dispersion Liquid 1 with the exception that 30.4 g (2.00 mmol per gram of the pigment) of 4-hydrazinobenzoic acid was used in place of 4-hydrazinophthalic acid hydrochloride. The self-dispersible pigment in the resultant Pigment Dispersion Liquid 15 was such that the introduced amount L of the lactone group is 0.10 mmol/g, the introduced amount C of the carboxylic acid group is 0.58 mmol/g, and L/C is 0.17.

Pigment Dispersion Liquid 16

A solution with 5.0 g of concentrated hydrochloric acid dissolved in 5.5 g of water was cooled to 5° C., and 1.5 g of 4-aminophthalic acid was added. A container in which this solution was placed was placed in an ice bath to agitate the solution, and an aqueous sodium nitrite solution obtained by dissolving 1.8 g of sodium nitrite in 9.0 g of water of 5° C. was added in a state that the liquid temperature was retained to 10° C. or less. After agitation was conducted additionally for 15 minutes, 6.6 g of carbon black (trade name "Black Pearls 880", product of Cabot) having a specific surface area of 220 m$^2$/g and a DBP oil absorption of 105 ml/100 g was added under agitation. A slurry obtained by agitating additionally for 15 minutes was filtered through filter paper (trade name "Standard Filter Paper No. 2"; product of Advantec) to obtain particles. The resultant particles were fully washed with water and then dried in an oven controlled to 110° C. to obtain self-dispersible carbon black. The resultant self-dispersible carbon black was diluted with ion-exchanged water to obtain Pigment Dispersion Liquid 16 in which the content of the pigment was 10.0%. The self-dispersible pigment in the resultant Pigment Dispersion Liquid 16 was such that the introduced amount L of the lactone group is 0.26 mmol/g, the introduced amount C of the carboxylic acid group is 0.71 mmol/g, and L/C is 0.37.

Pigment Dispersion Liquid 17

After 100.0 g of carbon black, 34.1 g of p-amino-benzoic acid and 720.0 g of water were mixed, 16.2 g of nitric acid was added dropwise, and agitation was conducted for 10 minutes. Carbon black (trade name "Black Pearls 880", product of Cabot) having a specific surface area of 220 m$^2$/g and a DBP oil absorption of 105 ml/100 g was used. Thereafter, an aqueous sodium nitrite solution obtained by dissolving 10.7 g of sodium nitrite in 50.0 g of water was added, and a slurry obtained by agitating additionally for hour was filtered through filter paper (trade name "Standard Filter Paper No. 2"; product of Advantec) to obtain particles. The resultant particles were fully washed with water and then dried in an oven controlled to 90° C. After the dried particles were diluted with ion-exchanged water, the pH of the resultant diluted liquid was adjusted to 7.5 with aqueous ammonia, and the liquid was filtered by using a prefilter and a filter having a pore size of 1 μm in combination to obtain Pigment Dispersion Liquid 17 in which the content of the pigment was 10.0%. The self-dispersible pigment in the resultant Pigment Dispersion Liquid 17 was such that the introduced amount L of the lactone group is 0.10 mmol/g, the introduced amount C of the carboxylic acid group is 0.34 mmol/g, and L/C is 0.29.

Pigment Dispersion Liquid 18

Pigment Dispersion Liquid 18 in which the content of the pigment was 10.0% was obtained in the same manner as in the preparation of Pigment Dispersion Liquid 1 with the exception that 22.0 g (1.17 mmol per gram of the pigment) of 4-hydrazinobenzenesulfonic acid was used in place of 4-hydrazinophthalic acid hydrochloride. The self-dispersible pigment in the resultant Pigment Dispersion Liquid 18 was such that the introduced amount L of the lactone group is 0.12 mmol/g.

Pigment Dispersion Liquid 19

Pigment Dispersion Liquid 19 in which the content of the pigment was 10.0% was obtained in the same manner as in the preparation of Pigment Dispersion Liquid 1 with the exception that 42.3 g (1.17 mmol per gram of the pigment) of P,P'-[[(4-hydrazinobenzyl)amino]methylene]bisphosphonic acid hydrochloride was used in place of 4-hydrazinophthalic acid hydrochloride in the preparation of Pigment Dispersion Liquid 1. The self-dispersible pigment in the resultant Pigment Dispersion Liquid 18 was such that the introduced amount L of the lactone group is 0.12 mmol/g.

Pigment Dispersion Liquid 20

Five hundred grams of carbon black and 3,750 g of ion-exchanged water were mixed and heated to 50° C. under agitation to obtain a mixture. Carbon black (trade name "NIPEX 170IQ", product of Orion Engineered Carbons) having a specific surface area of 200 m$^2$/g and a DBP oil absorption of 135 ml/100 g was used. The temperature of the mixture was kept to 50° C. while applying shear to the mixture by a bead mill using zirconia beads of 0.5 mm, and 4,500 g of an aqueous sodium hypochlorite solution (available chlorine concentration: 12%) was added dropwise over 3 hours. The shear was applied additionally for 30 minutes to obtain a dispersion liquid containing self-dispersible carbon black. Carbon black taken out by filtering the resultant dispersion liquid was neutralized with aqueous ammonia and then desalted by means of an ultrafilter until the electrical conductivity of the liquid reached 1.5 mS/cm. After the liquid was adjusted in such a manner that the content of the pigment is 10.0%, the resulting liquid was filtered by using a prefilter and a filter having a pore size of 1 μm in combination to obtain Pigment Dispersion Liquid 20 in which the content of the pigment was 10.0%. The self-dispersible pigment in the resultant Pigment Dispersion Liquid 20 was such that the introduced amount L of the lactone group is 0.22 mmol/g, the introduced amount C of the carboxylic acid group is 0.62 mmol/g, and L/C is 0.35.

Pigment Dispersion Liquid 21

A self-dispersible pigment was prepared according to the procedure described in "Example 31" of Japanese Patent Application Laid-Open No. 2012-528917 in reference to the description in "Example 31" of Japanese Patent Application Laid-Open No. 2012-528917 with the exception that the reagent used was changed to 4-hydrazinobenzoic acid. Carbon black (trade name "Black Pearls 880", product of Cabot) having a specific surface area of 200 m$^2$/g and a DBP oil absorption of 117 ml/100 g was used. The self-dispersible pigment prepared was diluted with ion-exchanged water to obtain Pigment Dispersion Liquid 21 in which the content of the pigment was 10.0%. The self-dispersible pigment in the resultant Pigment Dispersion Liquid 21 was such that the introduced amount L of the lactone group is 0.15 mmol/g, the introduced amount C of the carboxylic acid group is 0.48 mmol/g, and L/C is 0.31.

Pigment Dispersion Liquid 22

After pyridine was added to the above-described "Pigment Dispersion Liquid 20" to make it basic, the self-dispersible pigment was caused to react with thionyl chloride to bond a —C(=O)Cl group to a particle surface of the pigment. Thereafter, the —C(=O)Cl group was caused to react with 2,5-dihydroxyphenylacetic acid-γ-lactone to obtain a dispersion liquid containing a self-dispersible pigment with a lactone group bonded to the particle surface of the pigment through —C(=O)O—. After the resultant dispersion liquid was purified according to the same procedure as in the preparation of Pigment Dispersion Liquid 1, it was adjusted so as to have a pigment content of 10%. The thus-adjusted dispersion liquid was filtered by using a prefilter and a filter having a pore size of 1 μm in combination to obtain Pigment Dispersion Liquid 22 in which the content of the pigment was 10.0%. The self-dispersible pigment in the resultant Pigment Dispersion Liquid 22 was such that the introduced amount L of the lactone group is 0.33 mmol/g, the introduced amount C of the carboxylic acid group is 0.51 mmol/g, and L/C is 0.65.

Pigment Dispersion Liquid 23

A proper amount of ion-exchanged water was added to a self-dispersible pigment (trade name "Cab-O-Jet 300", product of Cabot) to obtain Pigment Dispersion Liquid 23 in which the content of the pigment was 10.0%. The self-dispersible pigment in the resultant Pigment Dispersion Liquid 23 was such that the introduced amount L of the lactone group is 0.07 mmol/g, the introduced amount C of the carboxylic acid group is 0.22 mmol/g, and L/C is 0.32.
Preparation of Ink:

After the following respective components were mixed and sufficiently agitated, the resultant mixtures were filtered under pressure through a membrane filter (trade name "HDCII FILTER", product of Pall Corporation) having a pore size of 1.2 μm to prepare respective inks. "ACETYLENOL E100" is a nonionic surfactant (acetylene glycol ethylene oxide adduct) produced by Kawaken Fine Chemicals Co., Ltd. The kinds of pigment dispersion liquids used in the preparation of the respective inks, DBP oil absorption values (ml/100 g) of the pigments, and introduced amounts C (mmol/g) of a carboxylic acid group, introduced amounts L (mmol/g) of a lactone group and L/C values in self-dispersible pigments are shown in Table 1.

Pigment dispersion liquid shown in Table 1: 40.00%
Glycerol: 7.0%
2-Pyrrolidone: 7.00%
Triethylene glycol: 7.00%
ACETYLENOL E100: 0.12%
Ion-exchanged water: 38.88%.

TABLE 1

Properties of ink

| | | No. of pigment dispersion liquid | DBP oil absorption (mL/100g) | Introduced amount of carboxyl group C (mmol/g) | Introduced amount of lactone group L (mmol/g) | L/C |
|---|---|---|---|---|---|---|
| Example | 1 | 1 | 135 | 0.75 | 0.13 | 0.17 |
| | 2 | 2 | 135 | 0.78 | 0.12 | 0.15 |
| | 3 | 3 | 135 | 0.66 | 0.10 | 0.15 |
| | 4 | 4 | 135 | 0.60 | 0.10 | 0.17 |
| | 5 | 5 | 135 | 0.60 | 0.09 | 0.15 |
| | 6 | 6 | 135 | 0.64 | 0.13 | 0.20 |
| | 7 | 7 | 135 | 0.64 | 0.13 | 0.20 |
| | 8 | 8 | 120 | 0.70 | 0.13 | 0.19 |
| | 9 | 9 | 120 | 0.62 | 0.10 | 0.16 |
| | 10 | 10 | 105 | 0.61 | 0.11 | 0.18 |
| | 11 | 11 | 105 | 0.88 | 0.18 | 0.20 |
| | 12 | 12 | 105 | 0.67 | 0.13 | 0.19 |
| Comp. Example | 1 | 13 | 105 | 0.50 | 0.09 | 0.18 |
| | 2 | 14 | 135 | 0.58 | 0.11 | 0.19 |
| | 3 | 15 | 135 | 0.58 | 0.10 | 0.17 |
| | 4 | 16 | 105 | 0.71 | 0.26 | 0.37 |
| | 5 | 17 | 105 | 0.34 | 0.10 | 0.29 |
| | 6 | 18 | 135 | 0.00 | 0.12 | — |
| | 7 | 19 | 135 | 0.00 | 0.16 | — |
| | 8 | 20 | 135 | 0.62 | 0.22 | 0.35 |
| | 9 | 21 | 117 | 0.48 | 0.15 | 0.31 |
| | 10 | 22 | 135 | 0.51 | 0.33 | 0.65 |
| | 11 | 23 | — | 0.22 | 0.07 | 0.32 |

Evaluation:

Each of the inks prepared was charged into an ink cartridge, and the ink cartridge was installed at a position of a black ink in an ink jet recording apparatus (trade name "PIXUS iP3100", manufactured by Canon Inc.) in which the ink is ejected from a recording head by the action of thermal energy. A magenta ink and a yellow ink of trade name "BCI-7e" (products of Canon Inc.) were used as color inks and installed at positions corresponding to the respective colors in the above recording apparatus. In this embodiment, a solid image recorded by applying an ink droplet whose mass is 30 ng±10% to a unit region of 1/600 inch×1/600 inch is defined as "its recording duty being 100%" in case of a black ink. In addition, a solid image recorded by applying two ink droplets (the mass of each droplet being 5 ng±10%) to a unit region of 1/600 inch×1/600 inch is defined as "its recording duty being 100%" in case of color inks. Recording conditions were set to the kind of paper: plain paper and printing quality: standard. Four kinds of plain paper of the trade names "PB Paper", "Canon Office" and "SW-101" (all, product of Canon Inc.), and "Classic White" (product of STEINBEIS) were used as recording media.

In the present invention, in the evaluation criteria of the following respective evaluation items, "A" and "B" were regarded as allowable levels, and "C" was regarded as an unallowable level. Evaluation results are shown in Table 2.

Bleeding Resistance:

A solid image of a color ink was set as a background, and characters of a black ink were recorded therein to prepare a recorded article. The solid image of the color ink was recorded with a yellow ink in case of a primary color and with a yellow ink and a magenta ink (a red image of a 1:1 application amount ratio) in case of a secondary color. A pattern of the recorded article prepared was visually observed to evaluate the bleeding resistance according to the following evaluation criterion.

A: Bleeding was inconspicuous with both primary color and secondary color in all the four recording media;
B: Bleeding was conspicuous with the secondary color in a part of the four recording media, but bleeding was inconspicuous with the primary color; and
C: Bleeding was conspicuous with both primary color and secondary color in a part of the four recording media.

White Blur Resistance:

A solid image of a black ink was set as a background, and characters of 24-point MS gothic font were recorded with a color ink therein to prepare a recorded article. The characters of the color ink were recorded with a yellow ink in case of a primary color and with a yellow ink and a magenta ink (a red image of a 1:1 application amount ratio) in case of a secondary color. A pattern of the recorded article prepared was visually observed to evaluate the white blur resistance according to the following evaluation criterion.

A: A white blur phenomenon was inconspicuous with both primary color and secondary color in all the four recording media;
B: A white blur phenomenon was conspicuous with the secondary color in a part of the four recording media, but the white blur phenomenon was inconspicuous with the primary color; and
C: A white blur phenomenon was conspicuous with both primary color and secondary color in a part of the four recording media.

Optical Density:

A 10 mm×15 mm solid image was recorded with a black ink to prepare a recorded article. After a day from the recording, the optical density of the solid image was measured by means of a reflection densitometer (trade name "Macbeth RD918", manufactured by Macbeth) to evaluate the optical density according to the following evaluation criterion.

A: The optical density was 1.5 or more in all the four recording media;
B: The optical density was 1.4 or more and less than 1.5 in all the four recording media; and
C: The average value of optical densities in the four recording media was less than 1.4.

TABLE 2

| | | White blur resistance | Bleeding resistance | Optical density |
|---|---|---|---|---|
| Example | 1 | A | A | A |
| | 2 | A | A | A |
| | 3 | A | A | B |
| | 4 | A | A | A |
| | 5 | A | A | B |
| | 6 | A | A | A |
| | 7 | A | A | B |
| | 8 | A | A | A |
| | 9 | A | B | B |
| | 10 | A | A | B |
| | 11 | A | A | B |
| | 12 | A | B | B |
| Comp. Example | 1 | A | C | B |
| | 2 | A | C | B |
| | 3 | A | C | B |
| | 4 | C | A | B |
| | 5 | B | C | C |
| | 6 | A | C | B |
| | 7 | C | A | A |
| | 8 | A | C | B |
| | 9 | B | C | C |
| | 10 | A | C | C |
| | 11 | B | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133780, filed Jun. 30, 2014, which is hereby incorporated by reference herein in its entirety.

What is claimed is:

1. An aqueous ink comprising a self-dispersible pigment having (i) a carboxylic acid group bonded directly or through another atomic group to a particle surface of a pigment and (ii) a lactone group bonded to the particle surface of the pigment,
wherein, as determined by a selective neutralization method, an introduced amount of the carboxylic acid group is 0.60 mmol/g or more and a ratio of an introduced amount (mmol/g) of the lactone group to the introduced amount (mmol/g) of the carboxylic acid group is 0.20 times or less.

2. The aqueous ink according to claim 1, wherein the DBP oil absorption of the pigment is 120 ml/100 g or more.

3. The aqueous ink according to claim 1, wherein the self-dispersible pigment has 2 or more carboxylic acid groups bonded to the particle surface of the pigment through another atomic group.

4. The aqueous ink according to claim 1, wherein said another atomic group is an arylene group.

5. The aqueous ink according to claim 1, wherein the pigment is carbon black.

6. The aqueous ink according to claim 1, wherein the self-dispersible pigment is produced by a process comprising a step of bonding a group $R_1$ in the general formula (1) to a particle surface of a pigment by a radical addition reaction induced by removal of a hydrogen atom from a compound represented by the general formula (1):

$$HN=N-R_1 \qquad (1)$$

wherein $R_1$ is a group having at least one of an aliphatic group and an aromatic group and being substituted with a carboxylic acid group.

7. An ink cartridge comprising an ink and an ink storage portion storing the ink, wherein the ink comprises the ink according to claim 1.

8. An ink jet recording method comprising ejecting an ink from a recording head of an ink jet system to record an image on a recording medium, wherein the ink comprises the ink according to claim 1.

9. The aqueous ink according to claim 1, wherein the introduced amount of the carboxylic acid group is 1.50 mmol/g or less.

10. The aqueous ink according to claim 1, wherein the DBP oil absorption of the pigment is 170 ml/100 g or less.

11. The aqueous ink according to claim 1, wherein the introduced amount of the lactone group is 0.18 mmol/g or less.

12. The aqueous ink according to claim 6, wherein the step is conducted in a liquid medium.

13. The aqueous ink according to claim 6, wherein the step is conducted in the presence of an oxidizing agent.

14. The aqueous ink according to claim 6, wherein the step is conducted at a pH of 1 or more to 13 or less.

* * * * *